United States Patent [19]

Cohen et al.

[11] Patent Number: 5,535,396
[45] Date of Patent: Jul. 9, 1996

[54] MODULATOR DATA/CONTROL EQUIPMENT

[75] Inventors: Yitzak Cohen, Yahud; Rafael Brody, Ganei–Tikva; Tzvika Magril; Dan Eshet, both of Netanya, all of Israel

[73] Assignee: Motorola, Inc., Schaumburg, Ill.

[21] Appl. No.: 308,475

[22] Filed: Sep. 19, 1994

Related U.S. Application Data

[63] Continuation of Ser. No. 174,582, Dec. 28, 1993, abandoned, which is a continuation of Ser. No. 907,493, Jul. 1, 1992, abandoned.

[30] Foreign Application Priority Data

Jul. 6, 1991 [GB] United Kingdom .................. 9114660

[51] Int. Cl.[6] ............................................. G06F 13/36
[52] U.S. Cl. .................. 395/733; 395/868; 364/DIG. 1; 364/229; 364/229.2; 364/230.1; 364/232.7; 364/240; 364/241.2; 364/241.3
[58] Field of Search .................................. 395/725, 275, 395/733, 868, 856

[56] References Cited

U.S. PATENT DOCUMENTS

| | | | |
|---|---|---|---|
| 4,080,649 | 3/1978 | Calle et al. ................................ | 395/725 |
| 4,172,284 | 10/1979 | Heinrich et al. ......................... | 395/725 |
| 4,438,189 | 3/1984 | Heinrich et al. ......................... | 395/725 |
| 5,099,414 | 3/1992 | Cole et al. ............................... | 395/200 |
| 5,146,597 | 9/1992 | Williams ................................... | 395/725 |
| 5,163,152 | 11/1992 | Okamoto ................................... | 395/725 |
| 5,212,796 | 5/1993 | Allison ..................................... | 395/725 |
| 5,218,703 | 6/1993 | Fleck et al. .............................. | 395/725 |
| 5,257,383 | 10/1993 | Lamb ........................................ | 395/725 |

*Primary Examiner*—Ayaz R. Sheikh
*Attorney, Agent, or Firm*—Wayne J. Egan

[57] ABSTRACT

Modular equipment for data acquisition/control of a system comprises a central unit (CPU Board), a plurality of input/output modules and a bus coupled therebetween. The central unit has successive approximation generator means (2) for generating a plurality of unique system addresses. The plurality of input/output modules each acquire information from/administering control of said system, and each of said plurality of input/outout modules is located at one of said unique addresses. The bus comprises an interrupt control line (IRQ) for requesting an interrupt service, whereon one or more of said plurality of modules periodically places an interrupt service request. Identifcation means, responsive to said successive approximation generator means (2), identifies an address of a module from which an interrupt service request emanated.

15 Claims, 6 Drawing Sheets

I/O BUS BLOCK DIAGRAM FIG.1

INTERRUPT FETCH CYCLE (WITH EXAMPLE OF:01100101)

FIG. 3 SUCCESSIVE APPROXIMATION GENERATOR

MOSCAD BUS READ CYCLE

MOSCAD BUS WRITE CYCLE

MODULATOR DATA/CONTROL EQUIPMENT

This is a continuation of prior application Ser. No. 08/174,582, filed Dec. 28, 1993, and now abandoned, by Yitzak Cohen et al., the same inventors as in the present application, which prior application is assigned to Motorola Israel Limited, the same assignee as in the present application, and which prior application is hereby incorporated by reference verbatim, with the same effect as though the prior application were fully and completely set forth herein. The prior application Ser. No. 08/174,582 is a continuation of prior application Ser. No. 07/907,493, filed Jul. 0, 1992, now abandoned.

BACKGROUND OF THE INVENTION

This invention relates, in general, to elements of a modular data/control system, such as a remote supervisory data acquisition and control system, and is particularly, but not exclusively, applicable to bus arbitration in such a system, including prioritized interrupt service routines for modular data/control equipment.

SUMMARY OF THE PRIOR ART

In a modular remote supervisory data acquisition and control system, comprising a CPU Board and a plurality of interchangeable I/O modules, each having the capability of requesting an interrupt service routine from the CPU, such as within a VME Bus, there arise problems with respect to the interconnection of modules within the modular system, and to the identification of a specific module which requests an interrupt.

Existing prior art techniques have intrinsic deficiencies in that the addition of each subsequent module to a system either lengthens the interrogation time of the system in response to a request from a module, as in the case of polling techniques, or increases the complexity of hardware implementation through the corresponding increase in the number of bus lines which couple the CPU and the module together, as in the case of interrupt priority techniques.

It can therefore be appreciated that there is a requirement within the art for a modular system in which there exists a flexible method of module interconnection. Furthermore, it is desirable for the modular system to possess a bus arbitration system which has a fast module interrogation time. Moreover, there is a requirement for the module interrogation time to be independent of the number of modules within the system and the complexity of hardware implementation to be minimal.

SUMMARY OF THE INVENTION

This invention addresses at least some of the disadvantages set out in the prior art described above. In accordance with the present invention, there is provided modular data/control equipment. A central unit is coupled to a plurality of input/output modules through a bus. Each input/output module is located at a unique address. The bus contains an interrupt control line ($\overline{IRQ}$) for requesting an interrupt service from one or more of the modules. The identification of an input/output module address, from which an interrupt service request emanates, is determined by a successive approximation generator means contained within the central unit.

A exemplary embodiment of the present invention will now be described with reference to the accompanying drawings.

DETAILED DESCRIPTION OF THE PREFERRED EMBODIMENT

Figure 1:
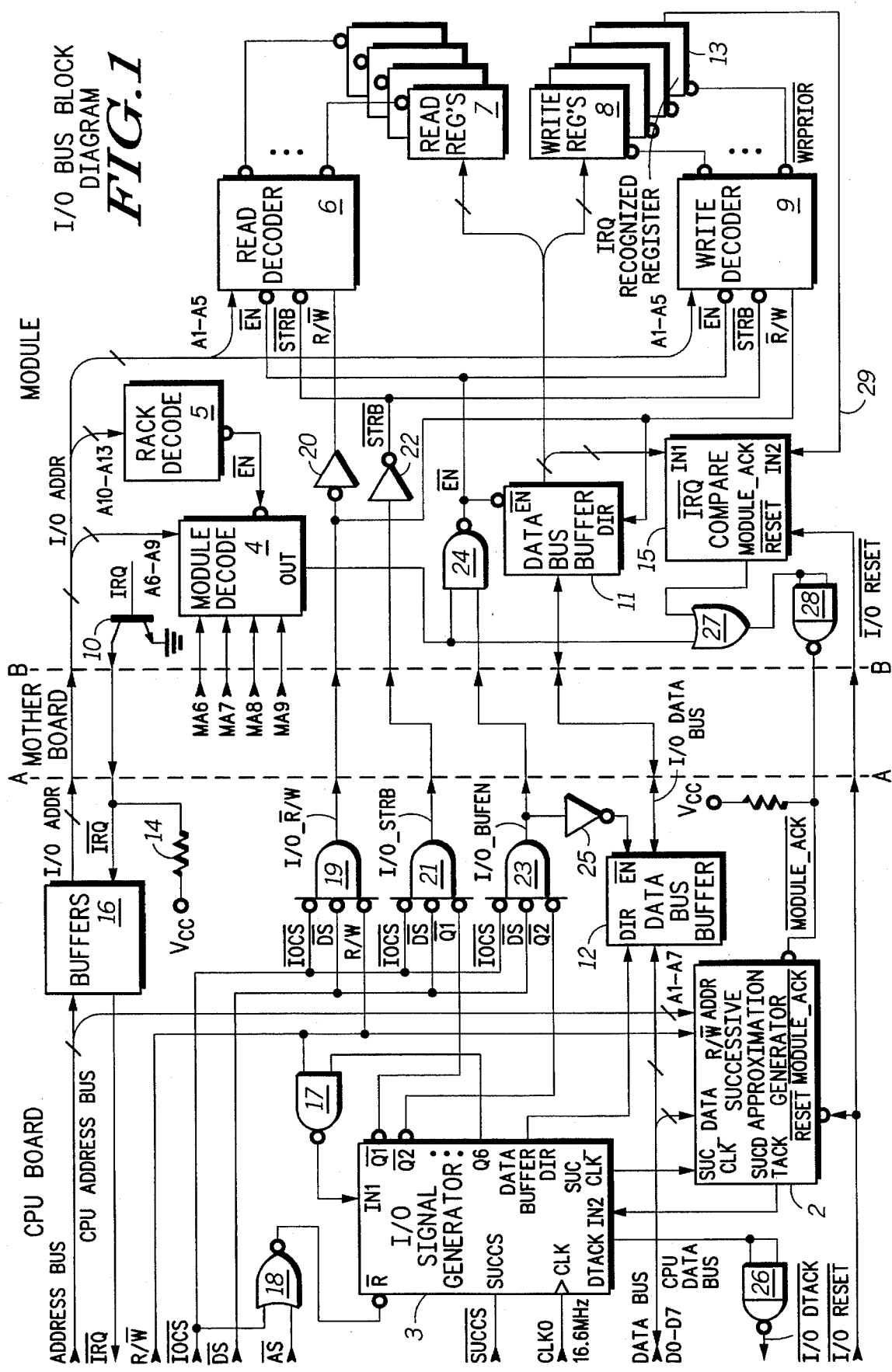
FIG. 1, illustrates a modular system in accordance with a preferred embodiment of the invention.

With reference to FIG. 1, a modular system, comprising a CPU Board (left of section A—A), an input/output module (right of section B—B) and an interconnecting mother board (between sections A—A and B—B), is illustrated. In the illustration, the CPU Board is based upon Motorola's MC68000 microprocessor, although it should be apparent to one skilled in the art that the substitution of this microprocessor for alternatives is equally acceptable. Furthermore, for the sake of simplicity, the description will be concerned with a modular system which contains only one I/O module. However, the explanation is applicable to systems containing up to 240 I/O modules.

The collector electrode of a wired-OR open collector 10, labelled Interrupt Request $\overline{IRQ}$, couples the I/O module to the CPU board through a buffer 16. The collector electrode $\overline{IRQ}$ of the wired-OR open collector 10 is utilised as a control line output while the emitter is coupled to ground potential. The control line may be tapped by up to a maximum of 240 separate I/O modules. When a module requests an interrupt handling routine, the control line becomes active. Furthermore, the control line $\overline{IRQ}$ is tied to a power supply $V_{cc}$ through a resistor 14.

A 13-bit CPU address bus $A_1$–$A_{13}$ is coupled through the buffer 16 to the I/O module. Bus lines $A_1$–$A_5$ are responsive to corresponding inputs on both a read decoder 6 and a write decoder 9 within the I/O module. Bus lines $A_6$–$A_9$ are responsive to corresponding inputs on a module decode circuit 4, and bus lines $A_{10}$–$A_{13}$ are responsive to corresponding inputs on a rack decode circuit 5. Each of a plurality of outputs from the read decoder 6, uniquely couples the read decoder 6 to a separate read register within the module's read register stack 7. Each of a plurality of outputs from the write decoder 9, uniquely couples the write decoder 9 to a separate write register within the module's write register stack 8. An Interrupt Request Recognition Register (IRR) 13, located in the I/O module's write register stack 8, is coupled to an $\overline{WPRIOR}$ output on the write decoder 9. An 8-bit data bus $D_0$–$D_7$ couples the read register and the write register together. Furthermore, the read and write registers are coupled to an $\overline{IRQ}$ comparison circuit 15 and a first data bus buffer 11, located on the module, by means of the data bus $D_0$–$D_7$. The data bus $D_0$–$D_7$ couples the data bus buffer 11 to the CPU through a second data bus buffer 12 located on the CPU Board. Data bus $D_0$–$D_7$ and address lines $A_1$–$A_7$ are responsive to corresponding inputs and/or outputs of a successive approximation generator 2.

An $\overline{\text{I/O RESET}}$ line is coupled to the $\overline{\text{RESET}}$ terminals of the successive approximation generator 2 and the $\overline{\text{IRQ}}$ comparison circuit 15. Interrupt Request Recognition Register IRR 13 is further coupled to an input $IN_2$ of $\overline{\text{IRQ}}$ comparison circuit 15 via bus 29. A module acknowledge output (Module-ACK) of $\overline{\text{IRQ}}$ comparison circuit 15 is coupled through a first input of an OR gate 27 to both inputs of an open collector NAND logic gate 28. An inverted output signal from logic circuit 28 is responsive to the Module _ACK input of the successive approximation generator 2. Power supply $V_{cc}$ is coupled through a resistor to the open collector output of logic gate 28. A second input to OR gate 27 emanates from an output of a module decode circuit 4. This output also provides a first input to a first NAND gate 24. First NAND gate 24 provides an enable signal to $\overline{\text{ENABLE}}$ inputs of the first data bus buffer 11, the read decoder 6 and the write decoder 9. Four module address lines $MA_6$–$MA_9$ are coupled to corresponding inputs on module decode circuit 4. An output from the rack decoding circuit is inverted and is responsive to a $\overline{\text{ENABLE}}$ input of the module decode circuit 4.

An input/output chip select line $\overline{\text{IOCS}}$ is coupled to a first input of a second NOR gate 18 and a first input of first, second and third AND gates 19, 21 and 23. A second input to the second NOR gate 18 is supplied by a $\overline{\text{AS}}$ input. An output from the second NOR gate 18 provides a reset signal $\overline{\text{R}}$ to an input/output signal generator 3. A second input to first, second and third AND gates 19, 21 and 23 is provided by a data strobe $\overline{\text{DS}}$ signal. A R/$\overline{\text{W}}$ signal is coupled to a third input of first AND gate 19 and a R/$\overline{\text{W}}$ input of the successive approximation generator 2. In addition, the R/$\overline{\text{W}}$ signal provides a first input to a second NAND gate 17. An output I/O-R/$\overline{\text{W}}$ from first AND gate 19 is coupled to a R/$\overline{\text{W}}$ input on the write decoder 9 and a data direction control input DIR on data bus buffer 11. Furthermore, the I/O-R/$\overline{\text{W}}$ from first AND gate 19 is coupled through an inverter 20 to a R/$\overline{\text{W}}$ input on the read decoder 6.

A clock signal CLK0 and a Successive Chip Select $\overline{\text{SUCCS}}$ signal are respectively coupled to a clock input and a $\overline{\text{SUCCS}}$ input of the I/O signal generator 3. A DATA_BUFFER_DIR output from the I/O signal generator 3 is coupled to a data direction control input DIR on data bus buffer 12. A SUC_CLK output on the I/O signal generator 3 is coupled to a corresponding input on the successive approximation generator 2. A data acknowledge signal output DTACK of the I/O signal generator 3 is coupled through an inverting open collector NAND logic gate 26 in order to provide a $\overline{\text{DTACK}}$ logic signal. A first $\overline{O_1}$ and second $O_2$ output emanate from the I/O signal generator 3. These outputs $\overline{O_1}$, $\overline{O_2}$ provide an active low third input signal to second AND gate 21 and third AND gate 23 respectively. An input/output strobe signal I/O-STRB is output from the second AND gate and is inverted through a second inverter to provide a strobe $\overline{\text{STRB}}$ signal to a strobe input $\overline{\text{STRB}}$ on both the read decoder 6 and the write decoder 9. An output I/O-BUFFEN emanates from the third AND gate and is coupled through a third inverter 25 to the enable pin $\overline{\text{EN}}$ of the data bus buffer 12 located on the CPU board. Furthermore, the I/O-BUFFEN output provides a second input to the first NAND gate 24.

The I/O signal generator 3 is responsive to the successive approximation generator 2 through a third input $IN_2$ which is coupled to the SUCDTACK signal. An output $O_6$ from the I/O signal generator 3, representing the MSB output of the I/O signal generator 3, is coupled to a second input of second NAND gate 17. An output from second NAND gate 17 provides a fourth input $IN_1$ to the I/O signal generator 3. Input signals on both $IN_1$ and $IN_2$ inputs generate an input/output data acknowledge signal $\overline{\text{IODTACK}}$.

Figure 6:
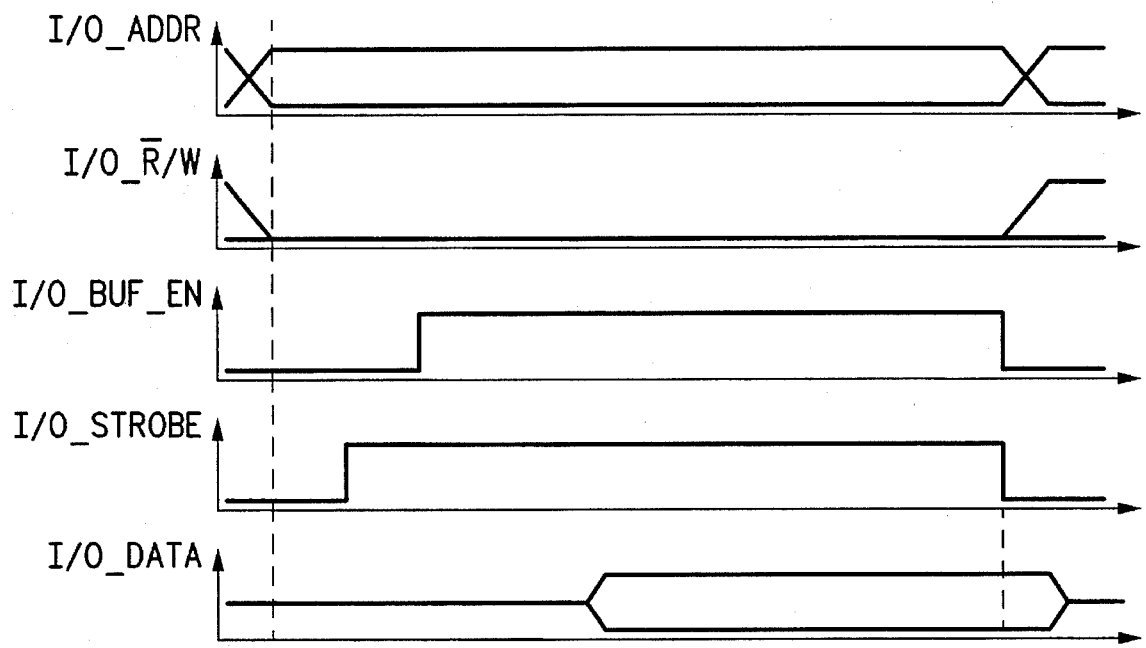
FIGS. 6a and 6b, respectively illustrate read and write cycles for a modular bus of the preferred embodiment of FIG. 1.
Figure 7:
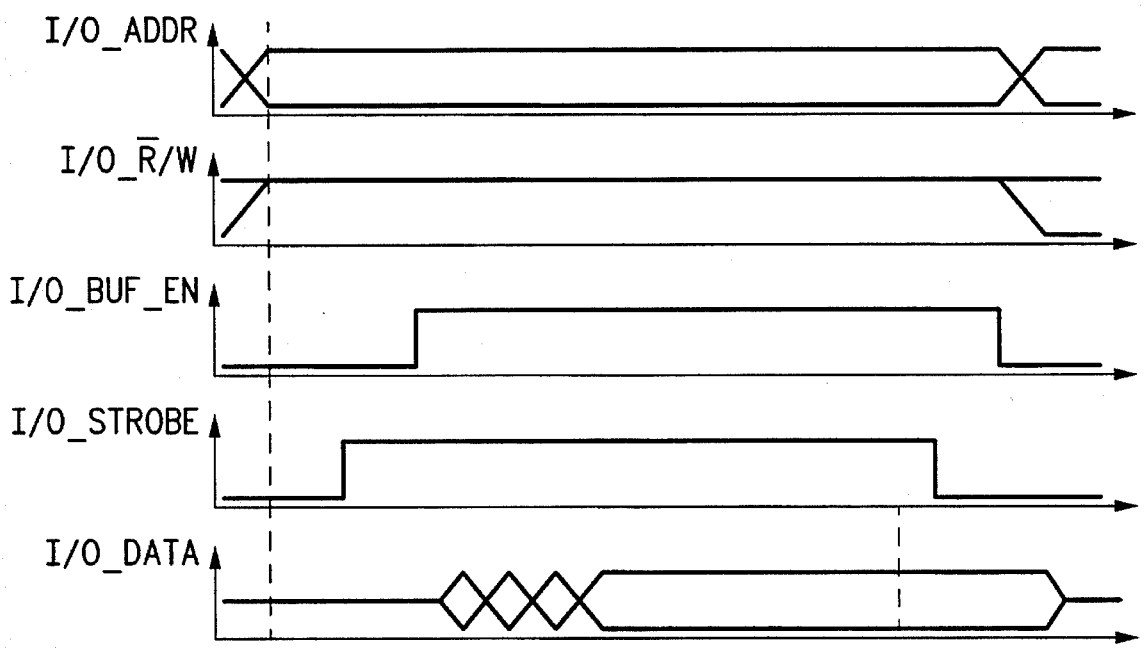

The configuration of the CPU board and the input/output module form a "MOSCAD Bus". The MOSCAD bus supports the CPU module and up to 240 different input/output modules. Thirteen bits of the bus are used for uniquely addressing the 240 I/O modules. Each additional module is located within a unique slot within a frame. It should be noted that the main CPU module is located at the first slot of the first frame and that each frame contains a maximum of 16 modules. FIGS. 6a and 6b, illustrate timing diagrams for such a MOSCAD bus. Identification of the location of a specific module is achieved through the control of the value on the module address lines $MA_6$–$MA_9$. The MOSCAD bus allows fast and flexible interrupt handling routines for multiple sources (modules) through the assignment of interrupt priority levels on it's $\overline{\text{EXIRQ}_1}$–$\overline{\text{EXIRQ}_3}$ input lines. Each module may be coupled to one or more of these input lines. In addition, the MOSCAD bus provides Direct Memory Access (DMA) from the CPU to the I/O modules. Furthermore, the MOSCAD bus allows for a second back-up CPU to be incorporated within the modular system. Table 1 defines the pins of the MOSCAD bus connector as a standard 64 pin DIN 41612 package.

TABLE 1

| Pin Number | Signal Name | CPU I/O | Pin Description |
|---|---|---|---|
| 1A | +12V_RTN | I | Power Supply (or Battery) Return. |
| 1C | +12V_RTN | I | Power Supply (or Battery) Return. |
| 2A | P. GND | I | Protective GND. Direct sinking of incoming surges through I/O Devices to the PWR_SPLY_RTN. |
| 2C | P. GND | I | Protective GND. Direct sinking of incoming surges through I/O Devices to the PWR_SPLY_RTN. |
| 3A | P. GND | I | Protective GND. Direct sinking of incoming surges through I/O Devices to the PWR_SPLY_RTN. |
| 3C | P. GND | I | Protective GND. Direct sinking of incoming surges through I/O Devices to the PWR_SPLY_RTN. |
| 4A | +12V | I | Power Supply (or Battery). |
| 4C | +12V | I | Power Supply (or Battery). |

TABLE 1-continued

| Pin Number | Signal Name | CPU I/O | Pin Description |
|---|---|---|---|
| 5A | AC FAIL | I | AC Fail indication from PWR_SPLY. Open collector, OPEN = TRUE, CLOSED = FALSE. |
| 5C | N.C. | | |
| 6A | N.C. | | |
| 6C | DC LOSS | I | DC Loss indication from PWR_SPLY. Open collector OPEN = TRUE, CLOSED = FALSE. |
| 7A | GND | O | Digital GND. |
| 7C | GND | O | Digital GND. |
| 8A | ACK | I | Module Acknowledge, indicate to CPU that data is available. |
| 8C | N.C. | | |
| 9A | I/O_$D_7$ | I/O | I/O Data Bus Bit $D_7$. |
| 9C | I/O_$D_6$ | I/O | I/O Data Bus Bit $D_6$. |
| 10A | I/O_$D_5$ | I/O | I/O Data Bus Bit $D_5$. |
| 10C | GND | O | |
| 11A | GND | O | |
| 11C | I/O_$D_4$ | I/O | I/O Data Bus Bit $D_4$. |
| 12A | I/O_$D_3$ | I/O | I/O Data Bus Bit $D_3$. |
| 12C | I/O_$D_2$ | I/O | I/O Data Bus Bit $D_2$. |
| 13A | I/O_$D_1$ | I/O | I/O Data Bus Bit $D_1$. |
| 13C | I/O_$D_0$ | I/O | I/O Data Bus Bit $D_0$. |
| 14A | I/O_RST | O | Hardware Module Reset. |
| 14C | N.C. | | |
| 15A | I/O_STROBE | O | Enable Signal when CPU Read/Write from/to Module Memory Space. Active High. |
| 15C | I/O_BUFFEN | O | Enable Signal when CPU Read/Write from/to Module Memory Space. Active High. |
| 16A | N.C. | | |
| 16C | N.C. | | |
| 17A | N.C. | | |
| 17C | PRIM_FAIL | I/O | Control indication on Primary CPU Fail. High enabling Secondary CPU allows access to the Modules. |
| 18A | EXIRQ$_2$ | I | Module Interrupt Request level 2 (mid-priority). Active Low. |
| 18C | EXIRQ$_3$ | I | Module Interrupt Request level 2 (high-priority). Active Low. |
| 19A | DMA_ACK | O | Acknowledge Signal from DMA Controller to the Device which asked for DMA. Active high. |
| 19C | EXIRQ$_1$ | I | Module Interrupt Request level 2 (low-priority). Active low. |
| 20A | DMA_REQ | I | DMA Request from Device to DMA Controller. Active low. |
| 20C | GND | O | Digital GND. |
| 21A | GND | O | Digital GND. |
| 21C | I/O_$A_{13}$ | O | I/O Address Bus bit $A_{13}$. |
| 22A | I/O_$A_{12}$ | O | I/O Address Bus bit $A_{12}$. |
| 22C | I/O_$A_{11}$ | O | I/O Address Bus bit $A_{11}$. |
| 23A | I/O_$A_{10}$ | O | I/O Address Bus bit $A_{10}$. |
| 23C | I/O_$A_9$ | O | I/O Address Bus bit $A_9$. |
| 24A | MA$_9$ | I | Module Address $A_9$, MSB in Slot Address of 16 slot Rack. |
| 24C | MA$_8$ | I | Module Address $A_8$, MSB in Slot Slot Address of 16 slot Rack. |
| 25A | I/O_$A_8$ | O | I/O Address Bus bit $A_8$. |
| 25C | I/O_$A_7$ | O | I/O Address Bus bit $A_7$. |
| 26A | MA$_7$ | I | Module Address $A_7$, third bit in Slot Address of 16 slot Rack. |
| 26C | MA$_6$ | I | Module Address $A_6$, LSB in Slot Address of 16 slot Rack. |
| 27A | I/O_$A_6$ | O | I/O Address Bus bit $A_6$. |
| 27C | I/O_$A_5$ | O | I/O Address Bus bit $A_5$. |
| 28A | I/O_$A_4$ | O | I/O Address Bus bit $A_4$. |
| 28C | I/O_$A_3$ | O | I/O Address Bus bit $A_3$. |
| 29A | I/O_$A_2$ | O | I/O Address Bus bit $A_2$. |
| 29C | I/O_$A_1$ | O | I/O Address Bus bit $A_1$. |
| 30A | I/O_R/W | O | I/O Read/Write. Control of data direction. Read Low. |
| 30C | GND | O | Digital GND. |
| 31A | GND | O | Digital GND. |
| 31C | I/O_CLK | O | I/O Clock: 921.6 kHz. |

TABLE 1-continued

| Pin Number | Signal Name | CPU I/O | Pin Description |
|---|---|---|---|
| 32A | +5V | O | Power Supply for Digital Circuits. |
| 32C | +5V | O | Power Supply for Digital Circuits. |

Bidirectonal line PRIM__FAIL and module address input $MA_6$ control a secondary CPU back-up circuit (not shown). A secondary CPU, located in slot 2 of the first rack, becomes operational when a CPU fail circuit (not shown) recognises that a malfunction in the main CPU has occurred. Access to the MOSCAD bus by the main CPU is denied and, consequentially, the back-up CPU is enabled.

Upon the reception of an $\overline{IRQ}$ signal from an I/O module, the CPU initiates a read cycle addressed to the Module Interrupt Request Fetch Register (MIRFR) located within each I/O module. The MIRFR address is considered by the CPU to be at an identical address within each module. When the CPU detects that the MIRFR within a module is being accessed, the direction of data flow through the data bus buffers 11, 12 is changed to a data write direction. N.B. The data write direction within the buffers is initiated even though the CPU is performing a read cycle. The identification of the module which requested the interrupt is based upon a successive approximation technique. In every case, the duration of the interrogation time is nine clock cycles and is regardless of the number of modules connected to the $\overline{IRQ}$ line. Upon detection of MIRFR accessing and with the data bus buffers 11, 12 switched to a data write direction, the successive approximation mechanism is initiated. An initial value of $80_{hex}$ is inserted onto an I/O data bus $D_0$–$D_7$ at the first period of a nine period clock cycle. This value is subsequently input into each module where it is compared with the contents of the Interrupt Request Recognition Register (IRR) 13 located in the I/O module's write register stack 8. The IRR 13 contains a value pertaining to the priority of both the module within the entire modular system. This value is unique to each specific I/O module and is fixed at application implementation in order to assign a relative servicing priority. Furthermore, the greater the assigned value, the greater the priority of the I/O module interrupt request. It should be noted that each interrupt control line $\overline{EXIRQ_1}$–$\overline{EXIRQ_3}$ of each input/output module has it's priority value stored within a unique IRQ Recognition Register (IRR) 13. The direct comparison between the IRR 13 and the initially inserted data bus value ($80_{hex}$) is performed within an $\overline{IRQ}$ comparison circuit 15. If the IRR value is greater than or equal to $80_{hex}$, a logic "1" is registered on a Module-ACK output of the $\overline{IRQ}$ comparison circuit 15. The output from the $\overline{IRQ}$ comparison circuit 15 acts as the input signal to the $\overline{Module\text{-}ACK}$ of a successive approximation generator 2. With specific reference to the successive approximation generator 2 of the preferred embodiment, it can be seen that inversion of the initial output Module-ACK from the $\overline{IRQ}$ comparison circuit 15 is required in order to acknowledge an IRR value greater than or equal to the initial data bus value of $80_{hex}$.

Figure 2:
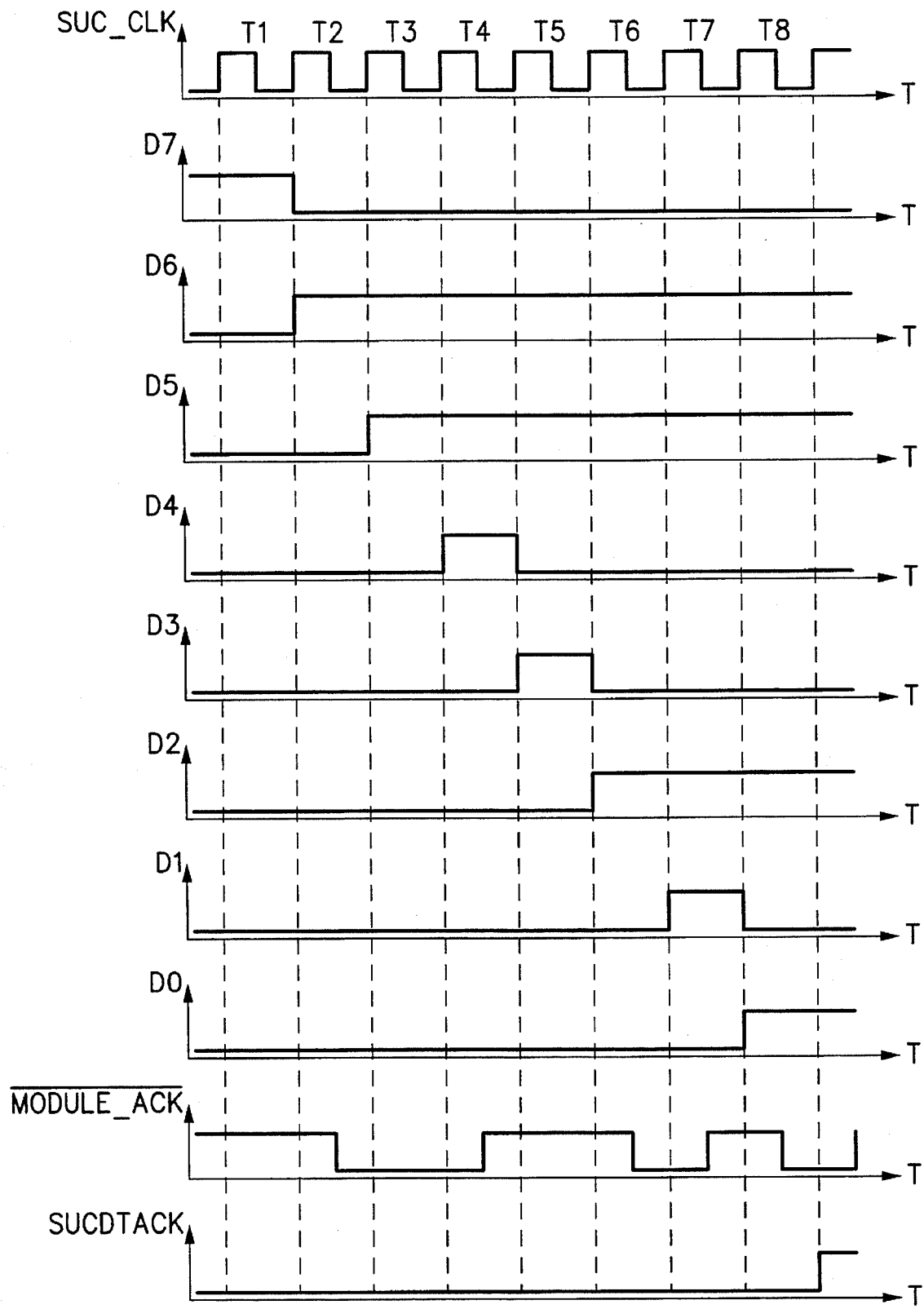
FIG. 2, illustrates a successive approximation interrupt fetch timing cycle in accordance with the preferred embodiment of FIG. 1.

Within the CPU board, the $\overline{Module\_ACK}$ signal provides a signal on which the decision-making portion of the successive approximation mechanism acts. With reference to FIG. 2, it can be seen that when the $\overline{Module\text{-}ACK}$ signal is a logical "0", the Most Significant Bit (MSB) of the data bus $D_0$–$D_7$ remains at a logic "1". However, if the $\overline{Module\text{-}ACK}$ remains high (logical "1"), the MSB of the data bus $D_7$ goes low. In addition, at the outset of the second clock cycle $T_2$ of the nine period clock cycle, the next most significant bit (MSB–1) is set to a high logic level such that the data bus $D_0$–$D_7$ outputs a value of either $C0_{hex}$ or $40_{hex}$. The exact output value is determined according to the result of the previous $\overline{Module\text{-}ACK}$ signal. The new value on the data bus is once again compared to the contents of the IRR 13 during the following clock cycle. At the end of nine clock periods, the identification process has been completed and the identification code (the value of the respective IRR 13) for the module which requested the interrupt has been output by the successive approximation mechanism. A microprocessor within the CPU immediately reads this identifying value because the CPU is still operating in a read state.

The nature of the module interrogation performed by the successive approximation mechanism ensures that the mechanism always identifies and services the I/O module which possesses the highest priority value. This behaviour is true even in the instance when several I/O modules simultaneously request an interrupt.

Operation of the successive approximation mechanism is controlled by a clock which operates at twice the operating rate of the I/O modules. The increased operating rate arises as a result of the buffers (11, 12) of the I/O module and the CPU being operative during the entire fetch cycle. Therefore, since there is no requirement for either hold time or setting time on the data bus, an operating frequency of twice the operating frequency of a prior art I/O bus results. For example, the entire successive approximation mechanism is complete within 4.51μs if a 1MHz clock is utilised within an I/O module.

Figure 3:
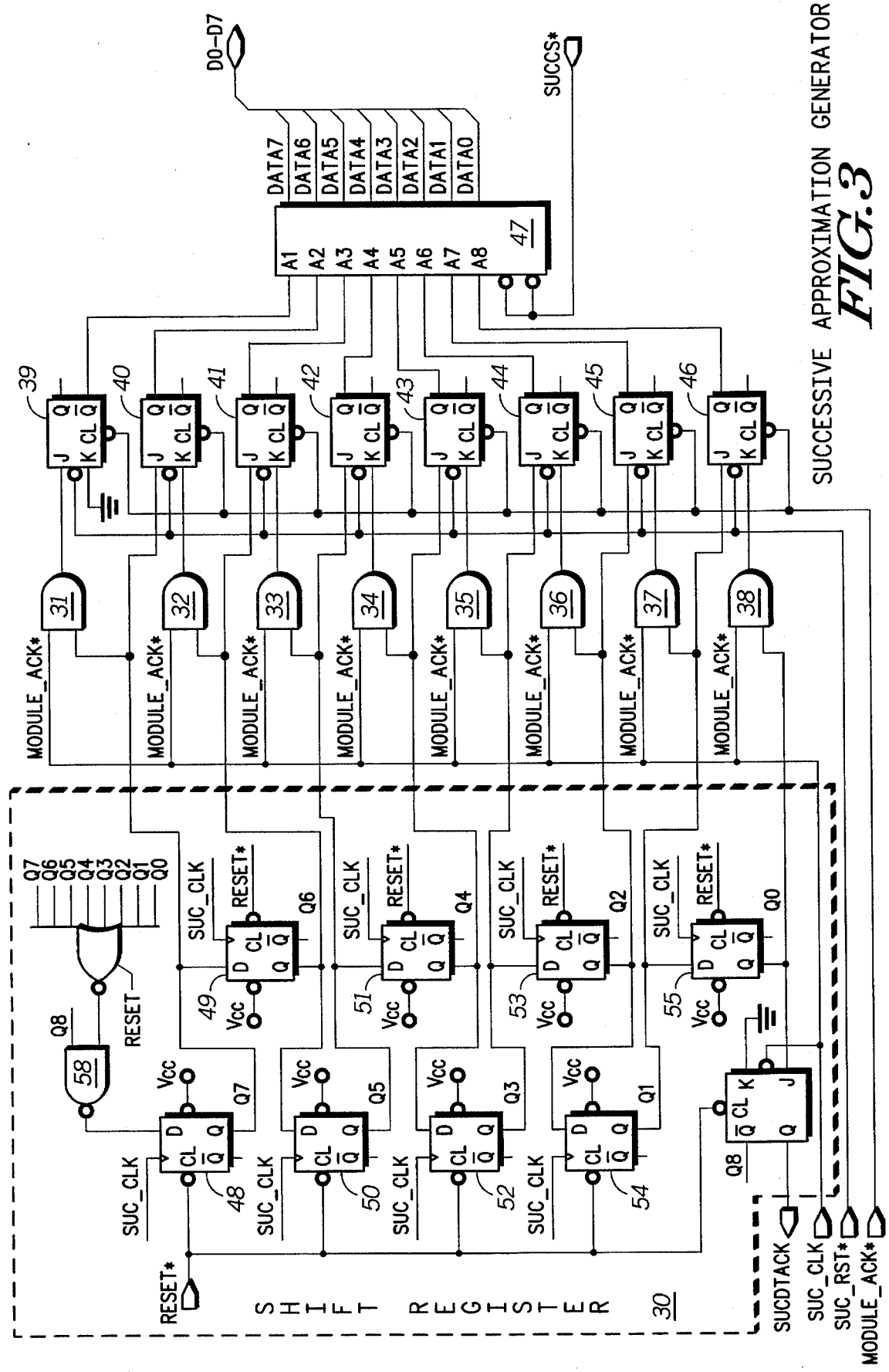
FIG. 3, illustrates a successive approximation generator in accordance with the preferred embodiment of FIG. 1.

FIG. 3, illustrates a successive approximation generator 2 in accordance with the preferred embodiment of the invention. The successive approximation generator 2 comprises a shift register 30 operating as a Johnson counter, eight AND gates 31–38, eight J–K flip-flops 39–46 and a unidirectional buffer 47. The shift register 30, further comprises eight D-type flip-flops 48–55 and a J–K flip-flop 56. Clock inputs to the D-type 48–55 and the J–K flip-flops 39–46 and 56 are coupled to a clock SUC CLK. It should be noted that the clock inputs to J–K flip flops 39–46 and 56 are in anti-phase with the clock inputs of the flip-flops contained within the shift register 30. Such a configuration prevents the establishment of race conditions between the shift register 30 and the J–K flip-flops 39–46. The reset input of the CPU board is coupled to the active low clear CL input on each D-type flip-flop 48–55 and the CL input of J–K flip-flop 56. A supply voltage $V_{cc}$ is coupled to each active low preset input of the D-type flip-flops 48–55. Outputs from AND gates 32–38 are respectively coupled to K inputs of J–K flip-flops 40–46. The $\overline{Module\_ACK}$ signal is coupled to all first inputs of AND gates 31–38. J and K inputs of J–K flip-flop 39 are respectively coupled to the output of AND gate 31 and to ground potential. Q output of J–K flip-flop 39 is left as an open circuit configuration. Similarly, $\overline{Q}$ outputs of J–K flip-flops 40–46 are also open circuit. Q outputs from D-type flip-flops 48–54 are coupled to D inputs of D-type flip-flops 49–55 respectively. Furthermore, Q outputs from D-type flip-flops 48–54 are respectively coupled to the second inputs of AND gates 31–37 and to J inputs of J–K flip-flops 40–46 via conductors $Q_7$–$Q_1$. $\overline{Q}$ outputs of D-type flip-flops 48–55 are open circuit. J input of J–K flip-flop 56 is coupled to both the Q output of D-type flip-flop 55 and the second input of AND gate 38. K input of J–K flip-flop 56 is coupled to ground potential. Q output of J–K flip-flop 56 is coupled to the SUCDTACK input of the input/output signal generator 3 whereas $\overline{Q}$ output provides an output for a conductor $Q_8$. $\overline{Q}$ output from J–K flip-flop 39 provides a first input $A_1$ to unidirectional buffer 47. $\overline{Q}$ outputs from J–K flip-flops 40–46 respectively provide inputs $A_2$–$A_8$ of unidirectional buffer 47. $\overline{Q}$ outputs of J–K flip-flops 40–46 are open circuit. Outputs $DATA_0$–$DATA_7$ of unidirectional buffer 47 comprise data bus $D_0$–$D_7$. The SUCRST output of the input/output signal generator 3 is coupled to each active low CL input of J–K flip-flops 39–46. Conductors $Q_0$–$Q_7$ provide inputs to a NOR gate 57. Output from NOR gate 57 and conductor $Q_8$ provide inputs to a NAND gate 58. Output from NAND gate 58 is responsive to the D input of D-type flip-flop 48.

When the MIRFR address is not being accessed, the successive approximation generator 2 circuit is in a reset state and the unidirectional buffer 47 is blocked. However, the input registered on the inputs $A_1$–$A_8$ of the unidirectional buffer is $80_{hex}$. When the MIRFR address is accessed, the shift register is released and the unidirectional buffer 47 becomes operational. The value of $80_{hex}$, initially located on the inputs to the unidirectional buffer 47, is transferred via the data bus $D_0$–$D_7$ to the input/output modules. A comparison between the value on the data bus $D_0$–$D_7$ and the contents with the IRR within the module is subsequently initiated. As has already been described above, the state of the $\overline{\text{Module\_ACK}}$ is determined from the result of this comparison.

During the first clock cycle, the $\overline{Q}$ output of J–K flip-flop 39 is at a high logic level (logical "1"). Consequentially, if the result from the comparison causes the $\overline{\text{Module-ACK}}$ to change to a logical "0", the output from AND gate 31 goes low. In addition, no change in the $\overline{Q}$ output of J–K flip-flop 39 occurs because both J and K inputs to this flip-flop are at logical "0". In the instance when the returned $\overline{\text{Module-ACK}}$ signal is logical "1", the J–K flip-flop 39 changes it's output state i.e. the $\overline{Q}$ output goes to logical "0". While the decision making process regarding the state of the first flip-flop (J–K flip-flop 39) is being considered i.e. during the first clock period, the Q output of the second J–K flip-flop (J–K flip-flop 40) is set to a high logic level (logical "1"). The new bit value registered on the unidirectional buffer 47 is transferred to the I/O modules at the beginning of the second clock period (refer to FIG. 2). A comparison of this new value with the contents of the IRR within the I/O module subsequently occurs. The result of this comparison determines the state of the $\overline{\text{Module ACK}}$ signal. A decision as to the state of the second J–K flip-flop 40 is once again taken and, simultaneously, the Q output of a third J–K flip-flop (J–K flip-flop 41) is set to a logical "1". This process continues for eight consecutive cycles of the SUC clock. At the end of this timed cycle, the I/O module which requested the interrupt has been identified and system arbitration has occurred. The ninth SUC clock period causes the generation of a data acknowledge SUCDTACK signal. The SUCDTACK signal indicates that the byte value on the data bus is valid and that the microprocessor can service the identified I/O module.

Figure 4:
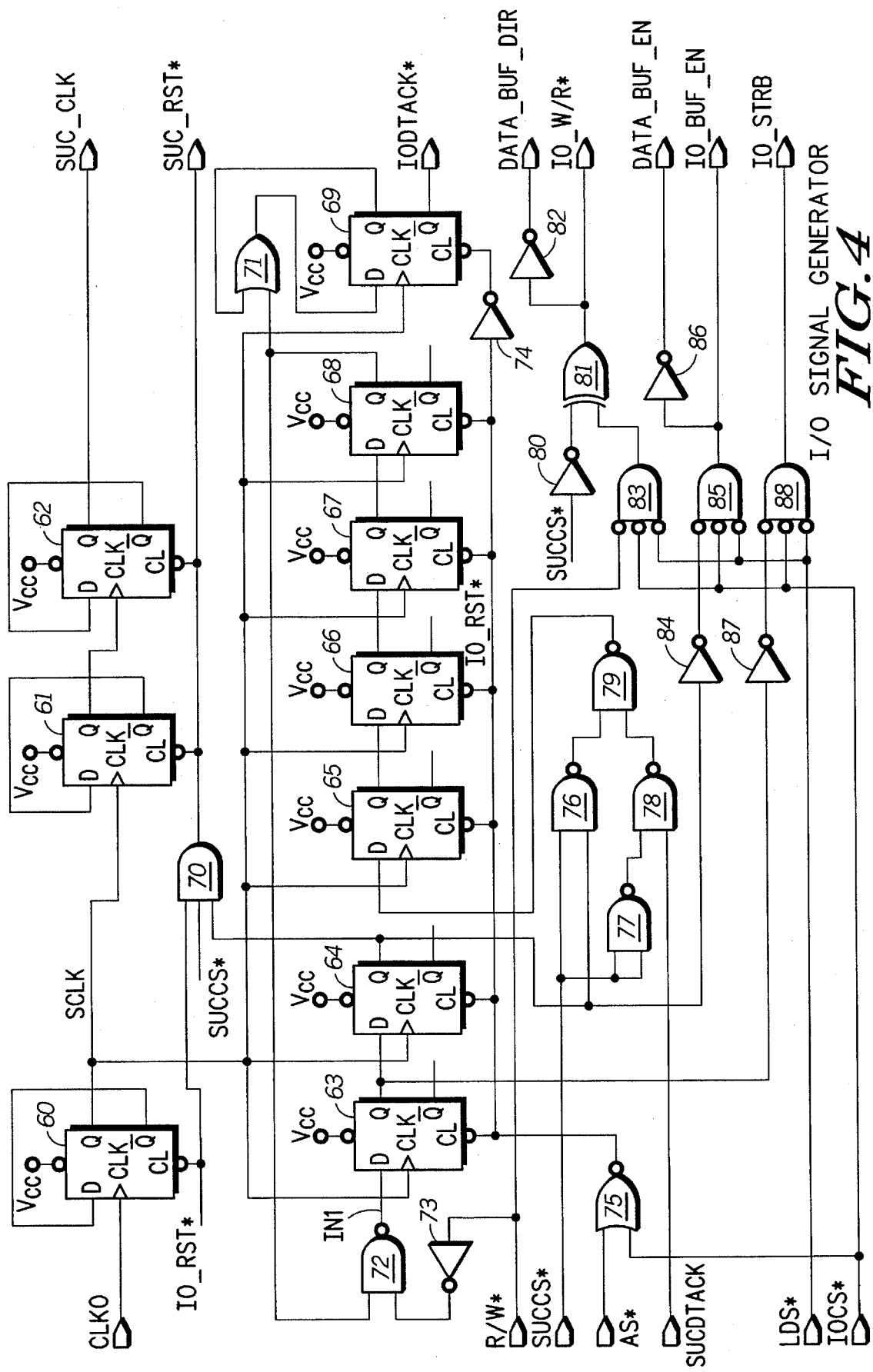
FIG. 4, illustrates an input/output signal generator in accordance with the preferred embodiment of FIG. 1.

The interrupt fetch cycle is a read cycle for the microprocessor and a write cycle for the I/O module. In order to obtain these concurrent cycles, the DATA_BUF_DIR and IO_$\overline{\text{R}}$/W signals must be reversed when accessing the MIRFR address. FIG. 4, illustrates the I/O signal generator 3 of the preferred embodiment. The I/O signal generator 3 utilises the circuit configurations and nomenclature of Motorola's MC68000 microprocessor wherein the requirement for wait states is fulfilled by the data acknowledge DTACK signal.

Clock signal CLK0 is coupled to the clock input of a D-type flip-flop 60. Q output from D-type flip-flop 60 provides a signal SCLK which is coupled to the clock input of a second D-type flip-flop 61. Q output from D-type flip-flop 61 is coupled to the clock input of a third D-type flip-flop 62. $\overline{Q}$ outputs of D-type flip-flops 60–62 are each coupled back to their respective D inputs. Q output from D-type flip-flop 62 is coupled to the SUC CLK input of the successive approximation generator 2. An $\overline{\text{I/O RST}}$ signal is coupled to the active low CL input of D-type flip-flop 60. Furthermore, the $\overline{\text{I/O RST}}$ signal is coupled to the first input of a tri-input AND gate 70. AND gate 70 provides a SUC RST signal and, in addition, is coupled to both active low CL inputs of D-type flip-flops 61 and 62. A supply voltage $V_{cc}$ is responsive to the active low preset of D-type flip-flops 61–62 and to D-type flip-flop 63–69. The SCLK clock output from the Q output of D-type flip-flop 60 is tapped by the clock inputs of D-type flip-flops 63–69. Q output from D-type flip-flop 68 provides a first input to both an OR gate 71 and a NAND gate 72. The output from OR gate 71 is coupled to the D input of D-type flip-flop 69. Q output from D-type flip-flop 69 is coupled to a second input of OR gate 71. $\overline{Q}$ output from D-type flip-flop 69 provides the I/O DTACK signal. $\overline{Q}$ outputs of D-type flip-flops 63–69 are open circuit. An output from NAND gate 72 is coupled to D input of D-type flip-flop 63. Signal $\overline{\text{AS}}$ provides a first input to a NOR gate 75. The output from NOR gate 75 is coupled directly to the CL inputs of D-type flip-flops 62–68; therein providing a second $\overline{\text{I/O RST}}$ signal. Furthermore, the output from NOR gate 75 is fed through an inverter 74 and then coupled to the active low CL input of D-type flip-flop 69. Q output from D-type flip-flop 63 is coupled to the D input of D-type flip-flop 64, and a first inverted input of an AND gate 88 through inverter 87. The Q outputs of D-type flip-flops 65–67 are respectively coupled to D inputs of D-type flip-flops 66–68. Signals $\overline{\text{LDS}}$ and $\overline{\text{I/O CS}}$ provide second and third inverted inputs to an AND gate 88 and, additionally, to the second and third inverted inputs of two further AND gates 83 and 85. Furthermore, the $\overline{\text{I/O CS}}$ signal is coupled to the second input of NOR gate 75. Q output of D-type flip-flop 64 is coupled to a third input of AND gate 70, and to a first inverted input of AND gate 85 via an inverter Furthermore, the Q output of D-type flip-flop 64 is responsive to a second input of a NAND gate 76. The $\overline{\text{SUCCS}}$ signal provides a first input to NAND gate 76 and the second input to AND gate 70. In addition, the SUCCS signal also provides two inputs to a second NAND gate 77. An output from second NAND gate 77 is coupled to a first input of a third NAND gate 78. A second input to the third NAND gate 78 is provided by the SUCDTACK signal. An output from each of the second and third NAND gates 76 and 78 provides a first and a second input to a fourth NAND gate 79. An output from the fourth NAND gate 79 is coupled to the D input of D-type flip-flop 65. A $\overline{\text{R/W}}$ signal is inverted through an inverter 73 and is then coupled to a second input of NAND gate 72. The $\overline{\text{R/W}}$ signal is further coupled to the third AND gate 83 through an inverting input. An XOR gate 81 provides an I/O-$\overline{\text{R}}$/W output and, additionally, is inverted through an inverter 82 to provide the DATA-BUF-DIR output. Two inputs to the XOR gate 81 are provided by an output from the third AND gate 83 and the inverted $\overline{SUCCS}$ signal. Inversion if the $\overline{SUCCS}$ signal is achieved through an inverter 80. An input output strobe signal I/O-STRB is generated from an output of AND gate 88. An output from the second AND gate 85 provides the I/O-BUFFEN signal and, through the use of an inverter 85, the DATA-BUF-EN signal.

The signals which control the I/O bus are I/O-$\overline{R}$/W, I/O-STRB, I/O-BUFFEN, DATA-BUF-EN and DATA-BUF-DIR. When, for example, an address in an I/O module is being accessed during normal (non-interrupt) operation, these signals are generated through the conventional D-type flip-flop path i.e. D-type flip-flops 63–69. When the MIRFR address is being accessed, a $\overline{SUCCS}$ signal is generated within the I/O signal generator 3. This $\overline{SUCCS}$ signal causes a SUCDTACK signal to appear at the D input of D-type flip-flop 65 and therefore signifies the end of the successive approximation process. Upon the reception of this SUCDTACK signal, the input/output cycle terminates. Additionally, the actuation of the DATA-BUF-DIR and I/O-$\overline{R}$/W signals allows data to flow from the CPU to the module even though the CPU is in a read cycle. The SUC-CLK signal emanating from the Q output of D-type flip-flop 62 is a clock cycle having a period four times greater than the SCLK signal emanating from the Q output of D-type flip-flop 60. Furthermore, the SUC-CLK signal is only visible to the CPU after the I/O-STRB and I/O-BUFFEN signals have been generated. This precautionary measure ensures that the successive approximation generator 2 only commences operation after valid ENABLE and I/O-bus signals have been registered.

Figure 5:
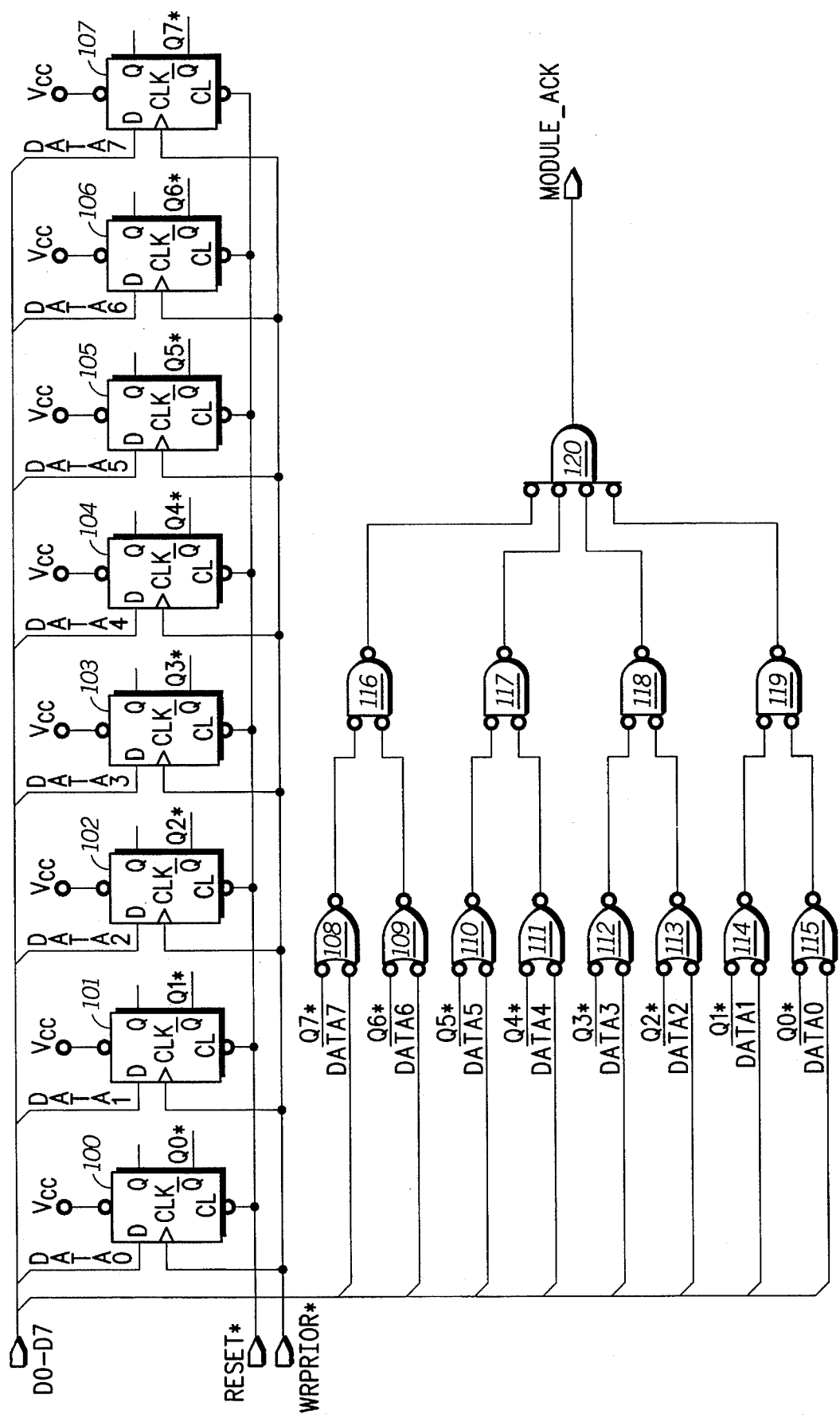
FIG. 5, illustrates a logic comparison circuit utilised by the preferred embodiment of FIG. 1.

With reference to FIG. 5, the comparison circuit utilised by an I/O module is illustrated. The circuit contains data bus $D_0$–$D_7$, eight D-type flip-flops 100–107, eight NOR gates 108–115, four NAND gates 116–120 and an AND gate 120. The $\overline{RESET}$ signal from the CPU is coupled to each of the active low CL inputs of the eight D-type flip-flops 100–107. Power supply $V_{cc}$ is also responsive to each active low preset input of D-type flip-flops 100–107. The clock input of each D-type flip-flops 100–107 is coupled to the $\overline{WRPRIOR}$ signal. Data bus lines D0–D7 are respectively coupled to the D inputs of D-type flip-flops 100–107. In addition, data bus lines $D_0$–$D_7$ are inverted and respectively coupled to a second input of each of the eight NOR gates 108–115. Q outputs of D-type flip-flops 100–107 are open circuit. $\overline{Q}$ outputs from D-type flip-flops 100–107 respectively provide signals $\overline{Q_0}$–$\overline{Q_7}$. Signals $\overline{Q_0}$–$\overline{Q_7}$ are respectively coupled to a first input of each of the eight NOR gates 115–108. An output from NOR gate 108 and an output from NOR gate 109 are inverted and coupled to a first and second input of NAND gate 116. An output from NOR gate 110 and an output from NOR gate 111 are inverted and coupled to a first and second input of NAND gate 117. An output from NOR gate 112 and an output from NOR gate 113 are inverted and coupled to a first and second input of NAND gate 118. An output from NOR gate 114 and an output from NOR gate 115 are inverted and coupled to a first and second input of NAND gate 119. An output from each NAND gate 116–119 provides an inverted input signal to AND gate 120. The Module-ACK signal emanates from an output of AND gate 120.

The comparator circuit $\overline{IRQ}$ Compare 15 receives information stored in the 8-bits of the IRR 13 as well as the data generated by the successive approximation generator 2. The combinatorial circuit illustrated continually makes comparisons between these values and outputs a logic level on the Module-ACK according to the results of this comparison. Provided that the value stored within the module's IRR 13 is greater than or equal to the data received on the data bus value $D_0$–$D_7$, the Module-ACK is at logical "1". Alternatively, when the value on the data bus $D_0$–$D_7$ is greater than the stored IRR value, the Module-ACK signal outputs a logical "0".

It can be appreciated that an invention so designed and described produces the novel advantages of performing an interrupt fetch cycle in a modular system with a preset interrogation time. Additionally, the interrogation time remains the same for up to 240 independent modules contained within the system. Furthermore, interrogation of the modules is performed through the addition of a single line to the bus network of the system and thereby ensures that the complexity of system implementation is minimal. Moreover, the MOSCAD bus allows for the expansion in the number of input/output modules contained within existing systems. In addition, user dedicated module slots can be further prioritorised by the use of the interrupt level within the MOSCAD bus.

It will, of course, be understood that the above description has been given by way of example only, and that modifications of detail can be made within the scope of the invention.

We claim:

1. Modular equipment for data acquisition/control of a system, the modular equipment comprising:

a) a central unit having successive approximation generator means, the successive approximation generator means arranged for generating a plurality of interrupt priority values and having a parallel data output for outputting said priority values and an interrupt service request result input for receiving an interrupt service request result, the successive approximation generator means being arranged to select and output an interrupt priority value, receive an interrupt service request result and selectively output an increased or decreased interrupt priority value depending on the interrupt service request result and successive interrupt service request results;

b) a plurality of input/output modules, each input/output module arranged for acquiring information from/administering control of said system, wherein each of said plurality of input/output modules has means for storing a unique interrupt priority value, thus forming a stored interrupt priority value, and has a parallel data input for receiving an interrupt priority value from the central unit, thus forming a received interrupt priority value, comparison means for comparing the received interrupt priority value with the stored interrupt priority value and an interrupt service request result output for providing an interrupt service request result in response to said comparison of the received interrupt priority value with the stored interrupt priority value and c) a bus, coupled between said plurality of input/output modules and said central unit, having an interrupt control line, for requesting an interrupt service, responsive to a request for interrupt service generated by a requesting input/output module, said bus having parallel data lines for connecting the parallel data output of the central unit to the parallel data inputs of the plurality of input/output modules and having an interrupt service request result line for connecting the interrupt service request result outputs of the plurality of input/output modules to the interrupt service request result input of the central unit; and, identification means, responsive to said successive approximation generator means, for identifying the requesting input/output module;

wherein said request for interrupt service is devoid of the stored interrupt priority value of the requesting input/output module.

2. Modular equipment in accordance with claim 1, wherein the bus contains a plurality of interrupt control lines each of which is assigned a unique interrupt priority value within the modular equipment.

3. Modular equipment in accordance with claim 2, wherein the stored interrupt priority value of each input/output module determines the priority of the each input/output module interrupt service request within the modular equipment.

4. Modular equipment in accordance with claim 3, where the interrupt control line comprises a collector electrode of a wired-OR open collector circuit coupling the requesting input/output module to the central unit.

5. Modular equipment in accordance with claim 3, where each input/output module includes an address based on the stored interrupt priority value of the each input/output module.

6. In modular equipment comprising a central unit coupled to a plurality of modules, the plurality of modules including a module that is requesting an interrupt, each module of the plurality of modules including a stored priority value that is unique in the modular equipment and that is based on the interrupt priority of the each module, a method for the central unit to service the module that is requesting an interrupt, the method comprising the steps of:

for a first cycle:
(a) by the central unit, generating an offered priority value, and providing the offered priority value to the plurality of modules;
(b) by the module that is requesting an interrupt, forming a result based on comparing the offered priority value to the module's stored priority value, and providing the result to the central unit;
(c) by the central unit, based on the result, selectively increasing or decreasing the offered priority value, and then providing the offered priority value to the plurality of modules;

for a second, third, . . . , and an Nth successive cycle:
(d) by the module that is requesting an interrupt, forming a result based on comparing the offered priority value to the module's stored priority value, and then providing the result to the central unit;
(e) by the central unit, based on the result, selectively increasing or decreasing the offered priority value, and then providing the priority value to the plurality of modules;

after the Nth successive cycle:
(f) by the central unit, identifying the module that is requesting an interrupt based on the offered priority value;

where the offered priority value for the first cycle is predetermined.

7. The method of claim 6, where N equals 9.

8. In the modular equipment of claim 6, each module of the plurality of modules includes an address that is based on the each module's stored priority value, and in the method of claim 6, the central unit identifying step (f) includes a step of addressing the module that is requesting an interrupt based on the offered priority value.

9. The method of claim 6, including a preceding step, by the module that is requesting an interrupt, of sending the central unit a request for interrupt signal, the request for interrupt signal being devoid of the stored priority value of the module that is requesting an interrupt.

10. The method of claim 6, wherein the offered priority value for the first cycle is $80_{hex}$.

11. Modular equipment comprising a central unit coupled to a plurality of modules, the plurality of modules including a module that is requesting an interrupt, each module of the plurality of modules including a stored priority value that is unique in the modular equipment and that is based on the interrupt priority of the each module, the modular equipment arranged for the central unit to service the module that is requesting an interrupt, the modular equipment comprising:

responsive to a first cycle:
central unit means for generating an offered priority value, and providing the offered priority value to the plurality of modules;
module means, responsive to requesting an interrupt, for forming a result based on comparing the offered priority value to the module's stored priority value, and providing the result to the central unit;
central unit means, based on the result, for selectively increasing or decreasing the offered priority value, and then providing the offered priority value to the plurality of modules;

responsive to a second, third, . . . , and an Nth successive cycle:
module means, responsive to requesting an interrupt, for forming a result based on comparing the offered priority value to the module's stored priority value, and then providing the result to the central unit;
central unit means, based on the result, for selectively increasing or decreasing the offered priority value, and then providing the priority value to the plurality of modules;

responsive to the termination of the Nth successive cycle:
central unit means for identifying the module that is requesting an interrupt based on the offered priority value;

where the offered priority value for the first cycle is predetermined.

12. The modular equipment of claim 11, where N equals 9.

13. The modular equipment of claim 11, wherein each module of the plurality of modules includes an address that is based on the each module's stored priority value, the central unit identifying means including means for addressing the module that is requesting an interrupt based on the offered priority value.

14. The modular equipment of claim 11, including module means for sending the central unit a request for interrupt signal, the request for interrupt signal being devoid of the stored priority value of the module that is requesting an interrupt.

15. The modular equipment of claim 11, wherein the offered priority value for the first cycle is $80_{hex}$.

* * * * *

UNITED STATES PATENT AND TRADEMARK OFFICE
CERTIFICATE OF CORRECTION

PATENT NO. : 5,535,396

DATED : July 9, 1996

INVENTOR(S) : Yitzak Cohen, Rafael Brody, Tzvika Magril, Dan Eshet

It is certified that error appears in the above-identified patent and that said Letters Patent is hereby corrected as shown below:

Column 12, line 33, between the words "said priority"

please insert --interrupt--.

Signed and Sealed this

Fifth Day of November, 1996

*Attest:*

BRUCE LEHMAN

*Attesting Officer*   *Commissioner of Patents and Trademarks*